US011921824B1

(12) United States Patent
Hester et al.

(10) Patent No.: US 11,921,824 B1
(45) Date of Patent: Mar. 5, 2024

(54) SENSOR DATA FUSION USING CROSS-MODAL TRANSFORMER

(71) Applicant: Amazon Technologies, Inc., Seattle, WA (US)

(72) Inventors: Todd Hester, Seattle, WA (US); Sheng Chen, Seattle, WA (US); Mark Buckler, Seattle, WA (US); Ayan Tuhinendu Sinha, Seattle, WA (US); Hitesh Arora, Pittsburgh, PA (US); Michael Lawrence LeKander, Seattle, WA (US); Hamed Pirsiavash, Ellicott City, MD (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 17/215,209

(22) Filed: Mar. 29, 2021

(51) Int. Cl.
| G06F 18/25 | (2023.01) |
| B25J 9/16 | (2006.01) |
| G06F 18/21 | (2023.01) |
| G06N 3/045 | (2023.01) |
| G06N 3/08 | (2023.01) |
| G06V 20/10 | (2022.01) |

(52) U.S. Cl.
CPC ............ *G06F 18/25* (2023.01); *B25J 9/1697* (2013.01); *G06F 18/2163* (2023.01); *G06N 3/045* (2023.01); *G06N 3/08* (2013.01); *G06V 20/10* (2022.01)

(58) Field of Classification Search
CPC .... G06F 18/25; G06F 18/2163; B25J 9/1697; G06N 3/045; G06N 3/08; G06V 20/10
See application file for complete search history.

(56) References Cited

U.S. PATENT DOCUMENTS

| 2022/0197306 A1* | 6/2022 | Cella ................. G06Q 30/0201 |
| 2022/0198254 A1* | 6/2022 | Dalli ..................... G06N 3/084 |
| 2023/0004797 A1* | 1/2023 | Chiu ....................... G06N 3/08 |
| 2023/0145535 A1* | 5/2023 | Hatamizadeh ........... G06N 3/02 |
| | | 514/460 |

OTHER PUBLICATIONS

Chen H, Jiang D, Sahli H. Transformer encoder with multi-modal multi-head attention for continuous affect recognition. IEEE Transactions on Multimedia. Nov. 12, 2020. (Year: 2020).*

* cited by examiner

*Primary Examiner* — Fayyaz Alam
(74) *Attorney, Agent, or Firm* — K&L Gates LLP (57) ABSTRACT

Techniques are generally described for fusing sensor data of different modalities using a transformer. In various examples, first sensor data may be received from a first sensor and second sensor data may be received from a second sensor. A first feature representation of the first sensor data may be generated using a first machine learning model and a second feature representation of the second sensor data may be generated using a second machine learning model. In some examples, a modified first feature representation of the first sensor data may be generated based at least in part on a self-attention mechanism of a transformer encoder. The modified first feature representation may be generated based at least in part on the first feature representation and the second feature representation. A computer vision task may be performed using the modified first feature representation.

20 Claims, 7 Drawing Sheets

SENSOR DATA FUSION USING CROSS-MODAL TRANSFORMER

BACKGROUND

Various sensors may be effective to generate different types of telemetry data to provide information about a physical environment. For example, cameras may capture color images and/or video of an environment, depth sensors may determine a distance between a sensor and various surfaces of the environment, microphones may capture audio data, etc. In various examples, computer vision techniques and/or other machine learning based techniques may be effective to make predictions about the physical environment on the basis of such telemetry data.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph comprising a sequence of words as an input. In various examples described herein, a transformer may receive a time series of data captured at various different times (e.g., frames of a video) as input. In various examples described herein, a cross-modal transformer receives two-dimensional image data and/or three-dimensional image data as input and collapses the input data into a one-dimensional vector of tokens.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. For example, for an input image the encoder layers may determine which parts of the image are relevant to other parts of the image and/or to other images received as part of the input data. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., object detection, velocity prediction, the next word in a sentence, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight a u from token is the dot product between $q_i$ and $k_j$. The attention weights are divided by the square root of the dimension of the key vectors, $$\sqrt{d_k},$$

which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe a spatial relationship of a plurality of tokens relative to other tokens. For example, an input token may represent a 16×16 block of pixels from an input frame of image data. The position embedding may describe a location within the frame of the 16×16 block of pixels (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional and/or higher-dimensional position embeddings that describe the spatial location of a token within the input data (e.g., a two-dimensional position within a frame, a three-dimensional position within a point cloud, etc.) and/or the temporal location of the token (e.g., a timestamp and/or frame number within a video). In various examples, the first encoder may learn a position embedding for each token in a frame of input data (e.g., 2D input data and/or 3D input data), and a position embedding for each timestamp (e.g., a temporal position of the token when the input data is time series data such as video and/or frames of image data captured over time). The sum of the position embedding and the timestamp may then be used to generate an embedding representing the token's position and temporal information.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

Described herein is a transformer based neural network that uses attention across features from multiple sensor modalities to fuse the sensor data and for making more accurate predictions for perception-related tasks. Examples of sensors may include different RGB image sensors (and/or other image sensors) having different fields-of-view, various depth sensors (e.g., stereoscopic camera pairs, time of flight (TOF) sensors), light detection and ranging (Lidar), radar, offline map data, navigation waypoints, etc. In various examples, the transformer based neural network described herein may be used to fuse sensor data from different sensor modalities in order to generate a holistic view of the physical surroundings of the sensors. For example, the various sensors may be used to capture information about a physical environment of a robot and/or to control the movements of the robot based on the physical environment. Information from different sensors may be fused by the attention mechanisms of the transformer encoder to better understand the environment, relative to approaches that perform computer vision processing on the basis of a single-sensor input and/or on the basis of various parallel pipelines of sensor data processing. In various examples, each of the task-specific decoders of the architecture described herein may apply self-attention on its input query embeddings, and cross-attention on the encoder output embeddings. The cross-attention mechanism enables each decoder to use (e.g., "attend to") relevant information from the encoder output embedding (representation) to learn its specific task such as semantic segmentation or bounding box detection. This provides the ability to scale the architecture described herein for an increasing number of tasks.

Transformer networks offer many benefits for fusing sensor data of different modalities. For example, transformers may be used to match features across different sensor data modalities with attention, rather than requiring perfect extrinsics calibration (e.g., the pose of each image sensor relative to one another) or even objects being represented in same reference frame. As such, since attention determines the context and relationship between sensor data of different modalities, a transformer-based cross-modal sensor data fusion system may be robust to poor extrinsic calibration and/or calibration errors. As used herein, "context" refers to the effect that data from other sensors has on the feature representation of sensor data received from a given sensor during fusion of such representations using the attention mechanisms of the transformer encoder. Additionally, attention over multiple objects allows the transformer models described herein to generate a de-duplicated set of objects without non-maxima suppression post-processing. Using the transformer encoder architecture described herein, there is no requirement that objects be present in the same reference frame. Accordingly, the transformer encoder architecture can be easily extended using 360 radar, offline maps in birds-eye-view (BEV), which may not include the same objects as represented in a forward-facing camera (for example).

Once the information is encoded with the transformer encoder, with attention across modalities, different transformer decoders may be added for different tasks according to the desired implementation. For example, transformer decoders effective to perform semantic segmentation of image data (e.g., distinguishing between different objects at a pixel level), emergency stop prediction (e.g., for autonomous navigation), BEV map prediction, pose estimation, etc.

In various examples, transformer decoders may be added to detect two-dimensional objects (e.g., represented as bounding boxes) and/or three-dimensional objects (e.g., represented as cuboid boxes). In some examples, datasets comprising annotated training data (e.g., labeled image data) exist and may be used to train various computer vision and/or decoder heads of the transformer models described herein. For example, an image depicting a cat and a dog may have a bounding box drawn around the cat that may be labeled as "cat" and a separate (potentially overlapping) bounding box drawn around the dog that is labeled as "dog." Object detectors may learn to detect and classify various different classes of objects present in such training images by learning features that correspond to the different classes.

Figure 1A:
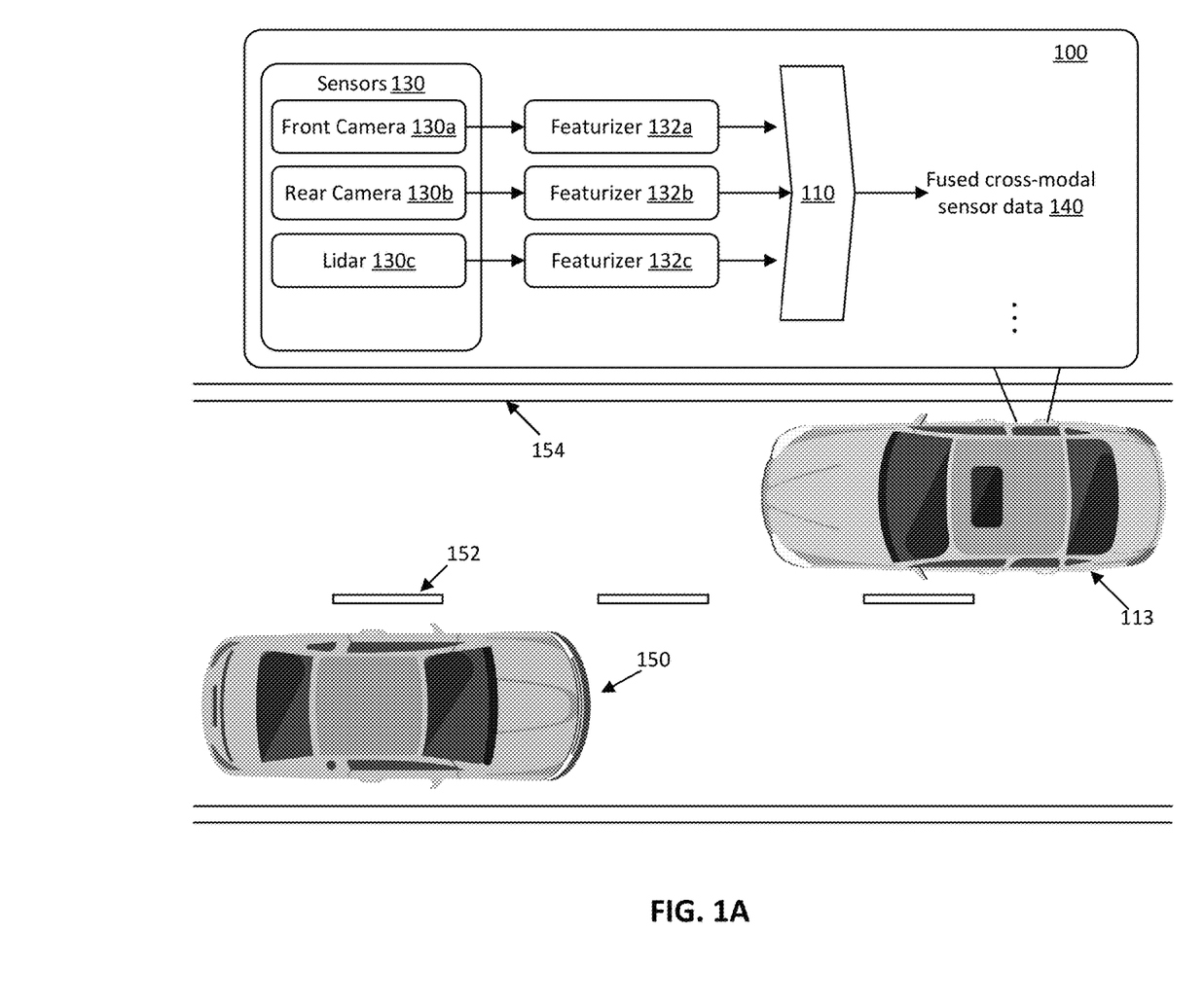
FIG. 1A is a diagram depicting an example system effective to fuse sensor data using a cross-modal transformer implemented in a vehicle, in accordance with various aspects of the present disclosure.

FIG. 1A is a diagram depicting an example system 100 effective to fuse sensor data using a cross-modal transformer implemented in a vehicle, in accordance with various aspects of the present disclosure. In the example of FIG. 1A, the system 100 is implemented in a vehicle 113 (e.g., an autonomous or semi-autonomous vehicle). In the example, the vehicle is driving on a roadway with visible demarcations 152 (e.g., lane indicators) and another vehicle 150. Curbs 154 may be located adjacent the roadway on which vehicle 113 is traveling.

Figure 1B:
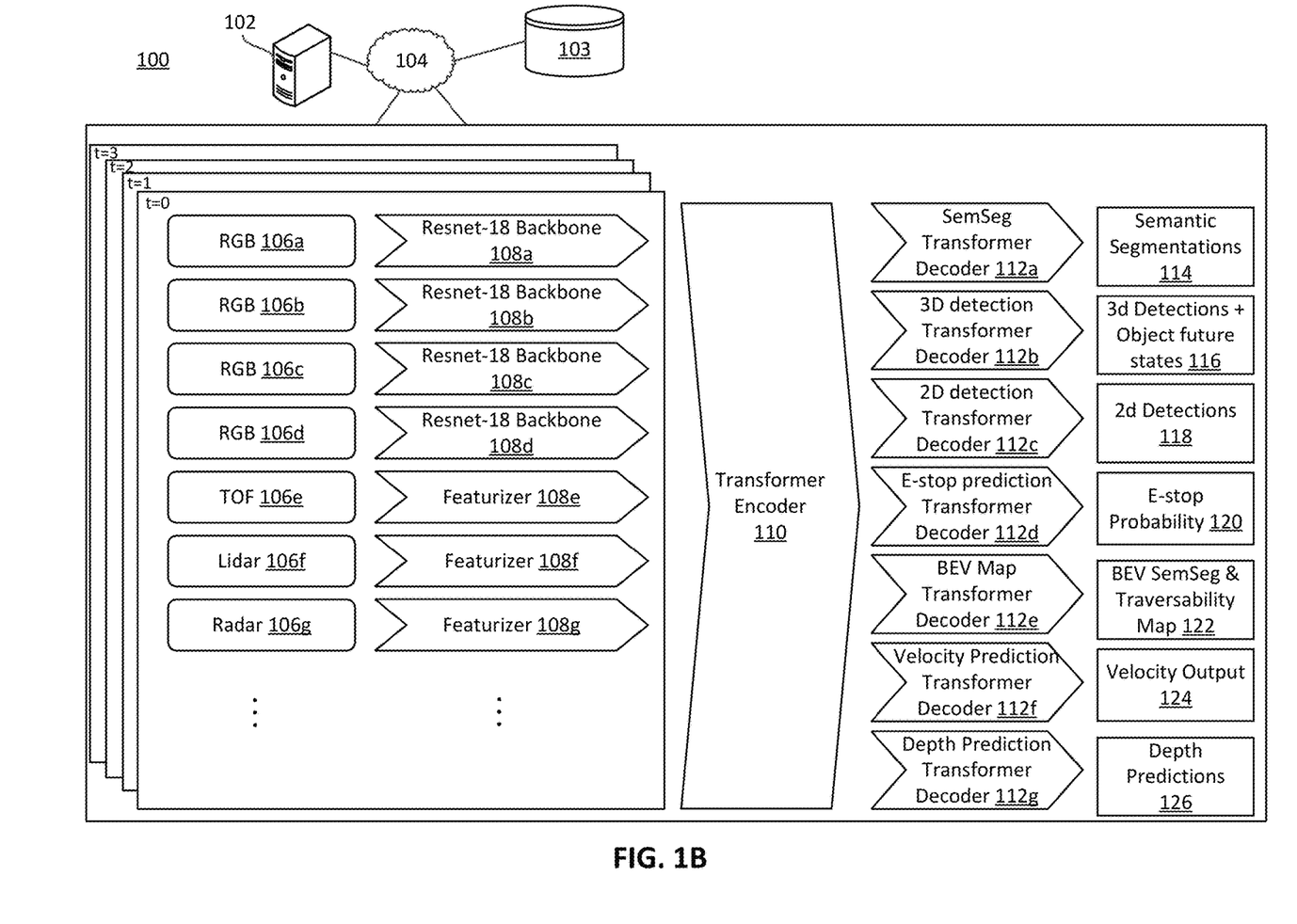
FIG. 1B is a block diagram showing an example system effective to fuse sensor data using a cross-modal transformer, arranged in accordance with various aspects of the present disclosure.

Vehicle 113 may be equipped with a variety of sensors 130 to enable vehicle 113 and/or a navigation system of vehicle 113 to sense and interpret the surrounding physical environment. In the example of FIG. 1A, the sensors 130 include at least a front camera 130a, a rear camera 130b, and lidar 130c. However, any sensors may be included according to the desired implementation. FIG. 1B depicts a different set of sensors, by way of example. Each sensor may output respective sensor data. For example, front camera 130a may capture RGB image data depicting the environment located within the field-of-view of front camera 130a (e.g., the area in front of vehicle 113). Similarly, rear camera 130b may capture RGB image data depicting the environment located within the field-of-view of rear camera 130b (e.g., the area behind the vehicle 113). Lidar 130c may capture three-dimensional image data (e.g., a point cloud) representing the environment surrounding the vehicle 113 (or a portion of the environment). The raw sensor data may be sent to respective featurizers 132a, 132b, 132c, etc. The featurizers may be machine learning models trained to extract feature data that represents the raw sensor data as a plurality of tokens (e.g., feature data of a reduced dimensionality). Different examples of featurizers are provided in reference to FIG. 1B. Additionally, position embeddings may be generated representing spatial information and/or temporal information of the sensor data. The tokens and/or positional embeddings may be provided to a transformer encoder 110. Transformer encoder 110 may generate modified tokens for each type of sensor data using the self-attention and multi-headed attention mechanisms described above. Accordingly, for each sensor, the transformer encoder 110 may generate fused cross-modal sensor data 140. The fused cross-modal sensor data 140 represents modified tokens that represent not only the sensor data corresponding to the input sensor, but also the context of the other sensor data input into the transformer encoder 110 using the transformer encoder 110's attention mechanisms.

Accordingly, the fused cross-modal sensor data 140 may be a holistic representation of the physical environment of vehicle 113. Additionally, the fused cross-modal sensor data 140 may provide redundancy whereby computer vision tasks performed using fused cross-modal sensor data 140 may be resilient to individual sensor failure, as context provided from other sensors may be used to overcome individual sensor failure.

As described in further detail below in reference to FIG. 1B, the fused cross-modal sensor data 140 may be sent to separate task-specific decoders learned for each desired task (see FIG. 1B). For example, the task-specific decoders may perform object detection and semantic segmentation to allow vehicle 113 to avoid obstacles and to stay within the proper lane while operating.

FIG. 1B is a block diagram showing an example system 100 effective to fuse sensor data using a cross-modal transformer, arranged in accordance with various aspects of the present disclosure. In various examples, system 100 may be implemented by one or more computing devices 102 that may be configured in communication over a network 104. Network 104 may be a communication network such as a local area network (LAN), a wide area network (such as the Internet), or some combination thereof. The one or more computing devices 102 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

System 100 may be effective to process sensor data of different modalities. In the example depicted in FIG. 1B, sensor data 106*a*, 106*b*, 106*c*, 106*d*, 106*e*, 106*f*, and 106*g* is shown for illustrative purposes. Other sensor data from other types of sensors and/or other sources of data may be fused using system 100. The particular types of sensor data shown and described herein are merely examples of the types of sensor data (and/or other data types) that may be used to perform predictive machine learning tasks.

In the example of FIG. 1B, there are multiple RGB image sensors (e.g., cameras) that may each have a different field of view. In an example, the various RGB image sensors may be positioned on an autonomous vehicle or robot to capture different fields of view to represent the physical environment around the autonomous vehicle or robot. For example, RGB 106*a* sensor data may be a frame of 2D image data representing a field of view to the left of a forward-facing robot. RGB 106*b* sensor data may be a frame of 2D image data representing a centered, forward-facing field of view of the robot (or other system). RGB 106*c* sensor data may be a frame of 2D image data representing a field of view to the right of the forward-facing robot. Similarly, RGB 106*d* sensor data may be a frame of 2D image data representing a rear-facing field of view of the robot. In the example of FIG. 1B, sensor data 106*a*-106*g* may be received at various points in time (e.g., at t=0, t=1, t=2, t=3, etc.). Accordingly, the various sensor data may be used by system 100 to make predictions over time.

In various examples, the RGB 106*a* sensor data, the RGB 106*b* sensor data, the RGB 106*c* sensor data, and the RGB 106*d* sensor data may be input into a backbone network to generate a plurality of tokens representing the various frames of 2D image data. In the example depicted in FIG. 1B, sensor data from each respective channel (e.g., from each image sensor) is sent to a respective backbone network (a ResNet-18 backbone in the example). Left RGB 106*a* sensor data may be sent to ResNet-18 backbone 108*a*. ResNet-18 backbone 108*a* may output a plurality of tokens that represent the input frame (e.g., the left RGB 106*a* sensor data). The plurality of tokens may comprise feature data representing the image. Additionally, the ResNet-18 backbone 108*a* may generate position embeddings representing each token. The position embeddings may represent the portion of the 2D frame of image data that a particular token represents. Although in FIG. 1B, ResNet-18 backbones are used in various examples, any backbone network (e.g., any convolutional neural network (CNN) or recurrent CNN (R-CNN)) may be used to generate tokens comprising feature representations of the input image data. As used herein, the term "featurizer" refers to any network or model that receives input data and generates tokens comprising a feature representation of the input data (e.g., in a reduced dimensionality).

In the example of FIG. 1B, RGB 106*b* sensor data may be sent to ResNet-18 backbone 108*b* (or another featurizer). ResNet-18 backbone 108*b* may output a plurality of tokens representing the RGB 106*b* sensor data along with position embeddings representing a position of each token within the frame. Similarly, RGB 106*c* sensor data may be sent to ResNet-18 backbone 108*c* (or another featurizer) and RGB 106*d* may be sent to ResNet-18 backbone 108*d* (or another featurizer).

Other types of sensor data may also be processed using system 100. For example, 3D data such as sensor data 106*e* (e.g., time of flight (TOF) depth map data), sensor data 106*f* (e.g., a lidar point cloud), sensor data 106*g* (e.g., radar data). Such 3D sensor data may be sent to a backbone network that is trained to generate a plurality of tokens and position embeddings for each of the plurality of tokens that represent such 3D sensor data. In FIG. 1B, sensor data 106*e* is sent to featurizer 108*e*, sensor data 106*f* is sent to featurizer 108*f*, sensor data 106*g* is sent to featurizer 108*g*. The plurality of tokens output by each of the featurizers may represent the input sensor data and the position embedding for a given token may represent the spatial position of that token within the input sensor data (e.g., within the point cloud, image frame, etc.).

Other sensor data may be used apart from what is shown and described depending on the desired implementation. For example, external data, such as offline maps (e.g., external map data used for navigating an autonomous vehicle) may be received as sensor data. In another example, destination waypoints (e.g., navigational points for navigating the autonomous vehicle) may be received.

Transformer encoder 110 may receive the plurality of tokens and the position embeddings output by each of the backbone networks 108*a*, 108*b*, 108*c*, 108*d*, 108*e*, 108*f*, and 108*g*. Transformer encoder 110 may generate modified tokens for each type of sensor data using the self-attention and multi-headed attention mechanisms described above.

The features from the backbone networks 108*a*-108*g* may be collapsed into a 2d (# channels*# features) tensor, collapsing the spatial dimension. The transformer encoder 110 takes two-dimensional image data and/or three-dimensional image data as input. Accordingly, the spatial dimensions are collapsed into one dimension, resulting in a d×HW feature map, where H is height and W is width (e.g., in terms of a number of pixels). A learned or fixed position embedding is added to each feature based on its location in the tensor. Since the transformer architecture is permutation-invariant, the fixed or learned position embeddings are added to the input of each attention layer.

The features from all sensor data backbone networks may be collapsed into a 2d tensor. For example, the first HW items may be from camera 1, the second HW items may be from camera 2, the third HW items may be from camera 3, the next H'W' items may be from lidar, etc. Learned position embeddings may be added for each position in this tensor, which are now not just learning to encode position but also which sensor and modality. Alternatively, everything may be projected into the same frame of reference and the relative positions may be used to create a hard-coded position embedding that takes into account which parts of the lidar image overlap with which parts of the RGB image, etc.

The modified tokens output by the transformer encoder may include feature data that includes contextual information about other sensor modalities. As shown in FIG. 1B, separate decoders may be learned for each desired task (e.g., computer vision tasks and/or other tasks). In the example of FIG. 1B, there may be a semantic segmentation transformer decoder 112 (e.g. "SemSeg transformer decoder 112*a*") effective to output semantic segmentation maps 114. Semantic segmentation maps 114 may be segmentation masks denoting which pixels belong to the same object and which pixels belong to the background. In another example, there may be a 3D detection transformer decoder 112b effective to output 3D detections and/or object future states 116. 3D object detections may be cuboids (e.g., three dimensional bounding boxes identifying the location and/or classification of objects in three-dimensional space). In another example, there may be a 2D detection transformer encoder 112c effective to output 2D detections 118 (e.g., bounding boxes for different classes of objects for which the 2D detection transformer decoder has been trained).

In another example that is specific to controlling an autonomous vehicle/robot, an E-stop prediction transformer decoder 112d may be included that is effective to generate an E-stop probability 120. This transformer decoder may be effective to determine the probability that an emergency stop will be required based on the physical surroundings and/or obstacles in the path of the autonomous vehicle/robot. In another example, that may be implementation specific, a birds-eye-view (BEV) map transformer decoder 112e may be effective to output BEV semantic segmentation data and/or a traversability map 122. The BEV map and/or semantic segmentation mask may be a transformed, top-down view of the surroundings of an autonomous vehicle and may be generated based on 2D image data and/or 3D data collected by sensors of various modalities (e.g., depth sensors and image sensors). In another example, a velocity prediction transformer decoder 112f may be effective to generate velocity output 124. The velocity output 124 may be predictions of the velocity of objects detected in an environment and may include the prediction of future positions of detected objects. In some examples, a depth prediction transformer decoder 112g may be effective to output depth predictions 126. Depth predictions 126 may be a depth map that fuses depth sensor data from different modalities into a more accurate depth map relative to a depth map pertaining to only a single depth sensor.

The set of transformer decoders 112a-112g depicted in FIG. 1B are for example purposes only. Any set and/or combination of different transformer decoders may be used in accordance with the particular implementation and the desired predictive capability of system 100. The separate transformer decoders may be learned for each predictive task. For example, for object detection, there may be a separate decoder for each possible object in the training set. Similarly, for semantic segmentation, there may be a separate transformer decoder per class. Task-specific decoders may be added as desired. For example, the BEV map transformer decoder 112e may be highly implementation specific, but may be added for applications that may find a top-down map of the surroundings useful. Since the sensor data fusion is accomplished using the attention mechanism by finding similar features, there is no need to project data into any particular reference frame. Additionally, highly precise sensor calibrations are not required since the relationships between the sensors are learned using the attention mechanisms.

Figure 2:
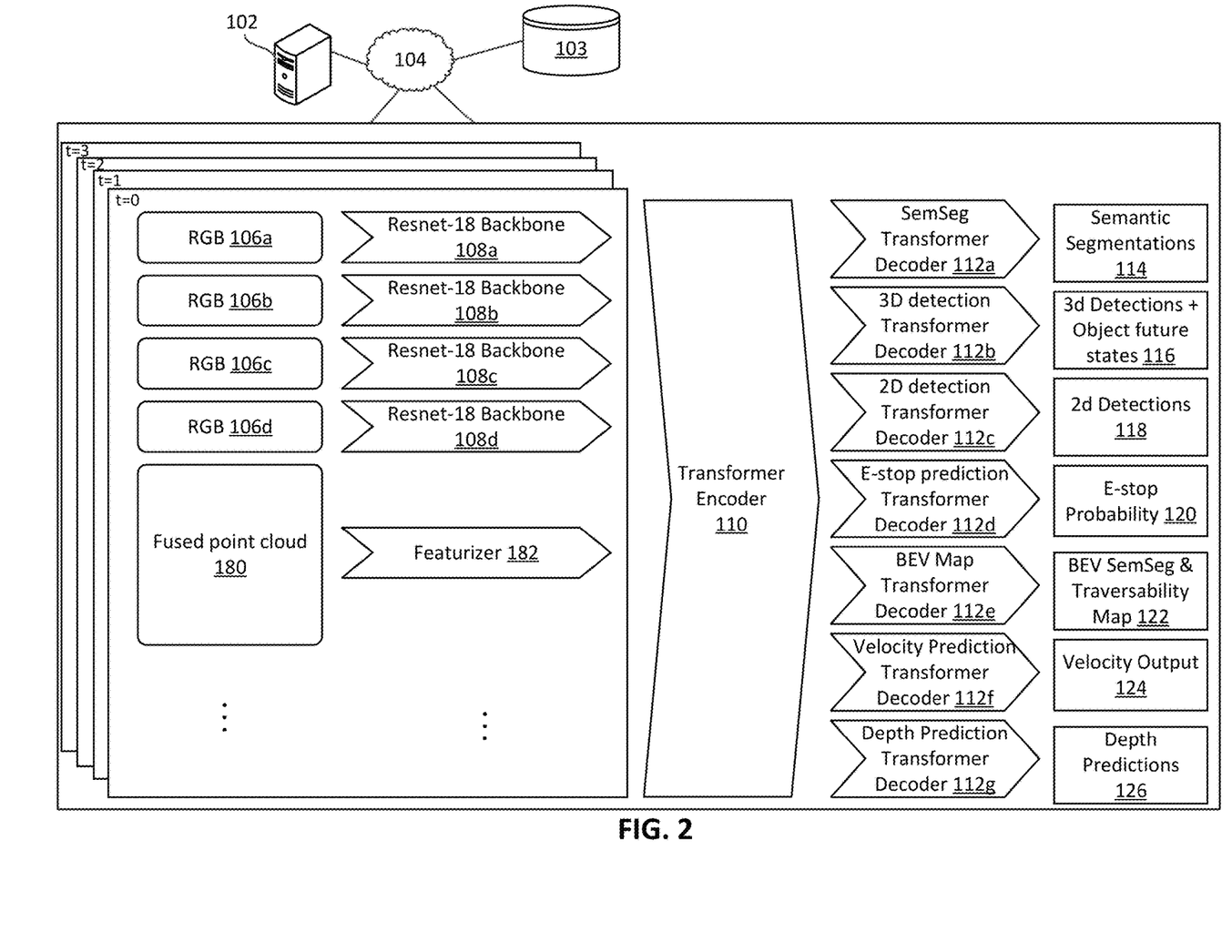
FIG. 2 is a block diagram showing another example system effective to fuse sensor data using a cross-modal transformer, in accordance with various aspects of the present disclosure.

FIG. 2 is a block diagram showing another example system effective to fuse sensor data using a cross-modal transformer, in accordance with various aspects of the present disclosure. In the example of FIG. 2, ranging sensor data information (e.g., stereoscopic camera data, TOF data, lidar data, radar data, etc.), or other sensor data may be fused into a single point cloud 180 prior to processing such combined sensor data in a single featurizer 182.

Figure 3:
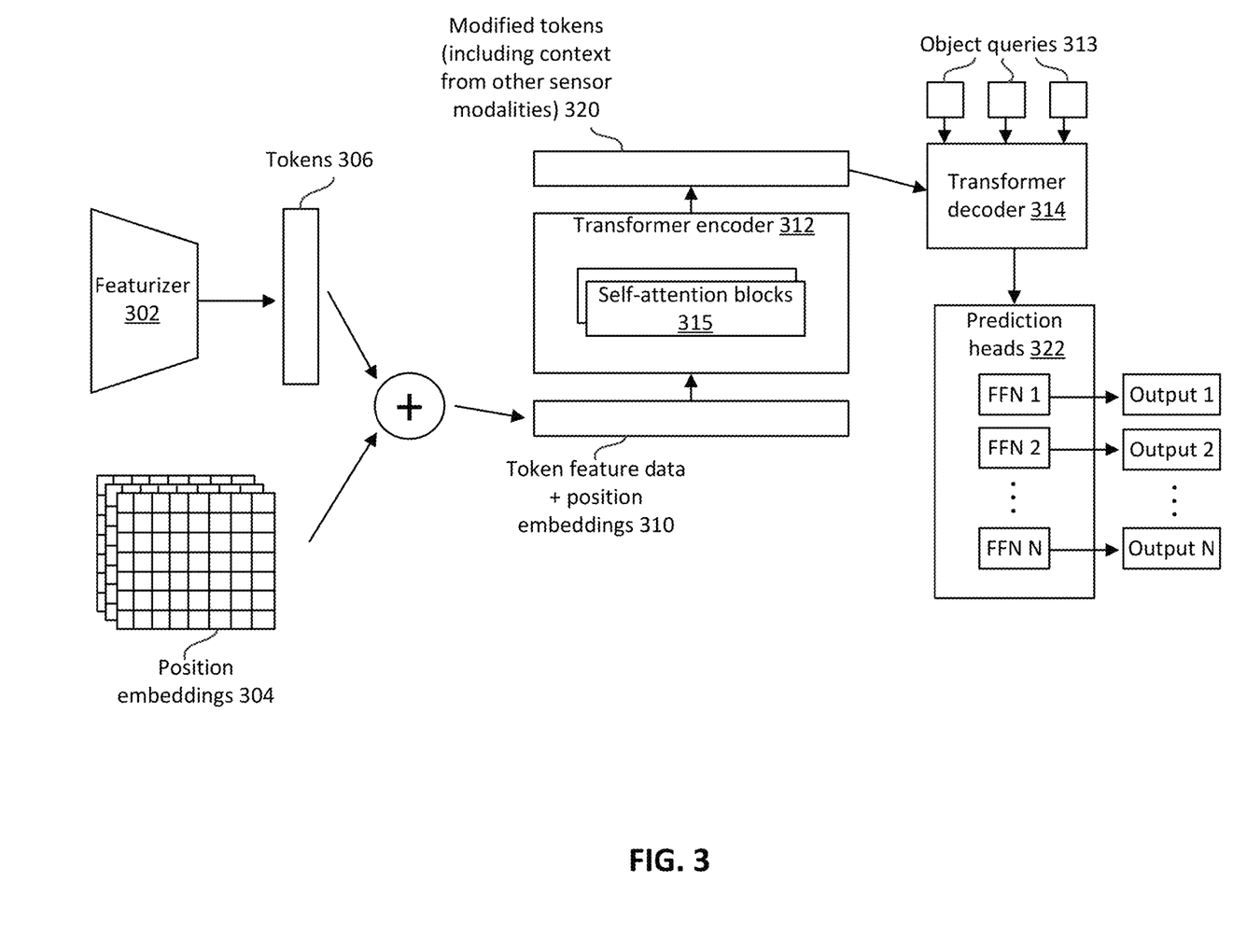
FIG. 3 is a block diagram illustrating sending tokens and position embeddings from a backbone network to a transformer encoder and decoder, in accordance with various aspects of the present disclosure.

FIG. 3 is a block diagram illustrating sending tokens and position embeddings from a backbone network to a transformer encoder, in accordance with various aspects of the present disclosure. In the example of FIG. 3, featurizer 302 may be a backbone network effective (e.g., a CNN or other backbone network) to receive sensor data and to generate a plurality of tokens 306 representing the input sensor data. As described previously, the tokens 306 may include feature representations of the input sensor data. Additionally, position embeddings 304 may be learned for the input sensor data. The position embeddings 304 may represent the spatial location within the input sensor data. For example, an input 2D frame of image data may be represented using a 16×16 grid of tokens. For example, a first token may represent the top left corner of the 2D frame of image data, a second token may represent another block of pixels of the 2D frame of image data, etc. The position embeddings 304 may represent the spatial locations within the 2D frame of image data for each token. Similarly, in a 3D point cloud, the position embeddings 304 may represent a three-dimensional location of a point or group of points within the point cloud. As previously described, the position embeddings 304 may also represent and/or be combined with temporal information (e.g., a timestamp and/or frame number of a video) representing temporal information of the input sensor data.

The tokens 306 and corresponding position embeddings 304 may be concatenated or otherwise combined to generate token feature data and position embeddings 310. The token feature data and position embeddings 310 may be input into the transformer encoder 312 that includes the various encoder layers, with each encoder layer including self-attention blocks 315. The transformer encoder 312 may output modified token 320 that generate modified feature representations of the input tokens, but modified based on the context from other sensor modalities using the attention mechanisms of the transformer encoder 312.

The modified tokens 320 may be sent to various transformer decoders 314 along with learned object queries 313. The object queries 313 may be task specific (e.g., a sem-seg object query, an object detection object query, etc.). The output of the transformer decoders 314 may be sent to prediction heads 322. The particular transformer decoders 314 and/or prediction heads 322 may be implementation-specific according to the desired application. Prediction heads 322 may comprise a plurality of feed forward networks (FFNs 1, 2, . . . , N) that may each be configured to generate respective outputs 1, 2, . . . , N.

Figure 4:
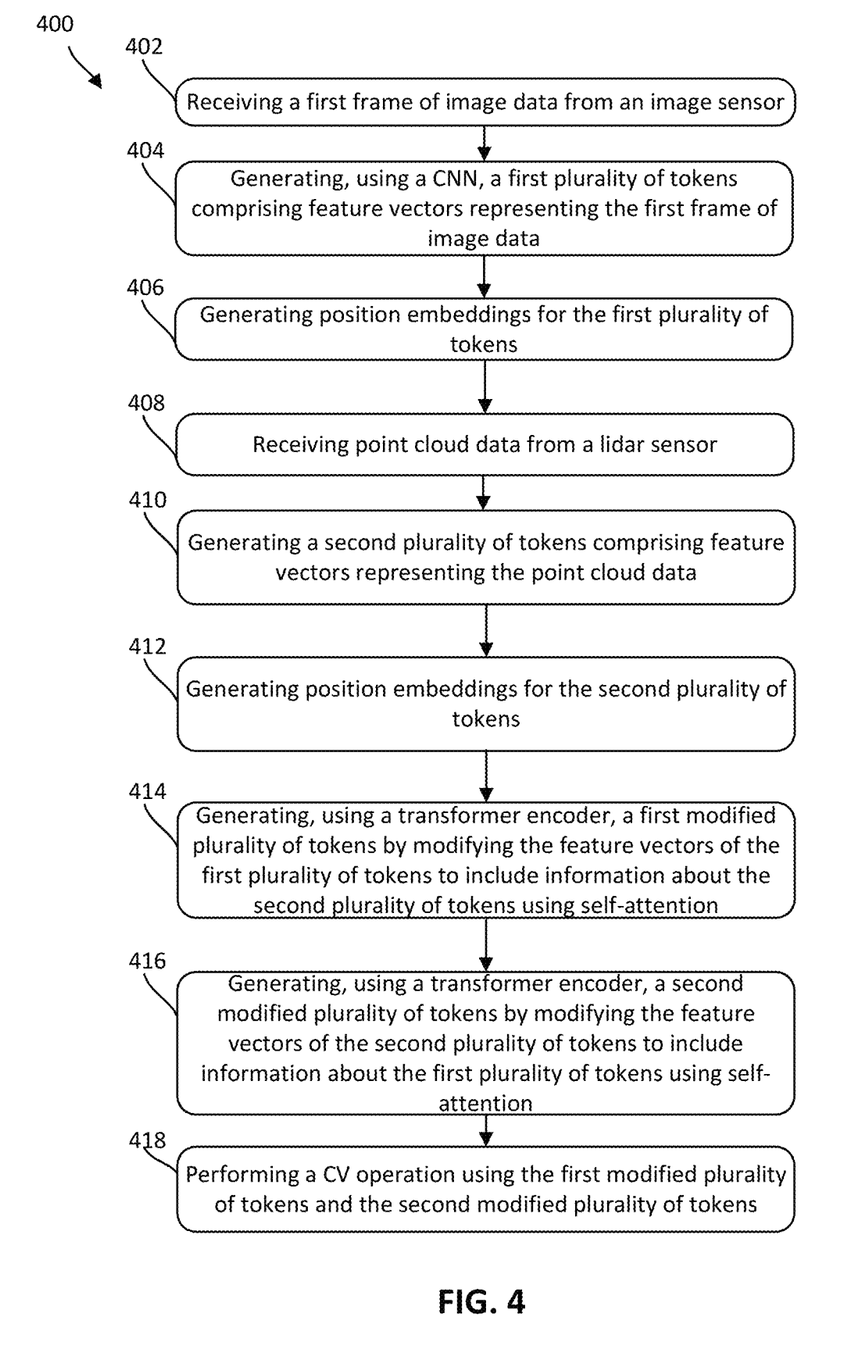
FIG. 4 depicts an example process for sensor data fusion using a cross-modal transformer, in accordance with various aspects of the present disclosure.

FIG. 4 depicts an example process 400 for sensor data fusion using a cross-modal transformer, in accordance with various aspects of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 402, at which a first frame of image data may be received from an image sensor.

For example, an image sensor may capture a frame of image data comprising a 2D grid of pixels. Processing may continue at action 404, at which a CNN (or other backbone network) may be used to generate a first plurality of tokens comprising feature vectors that represent the first frame of image data. Additionally, at action 406, position embeddings may be generated. Each position embedding may represent a spatial position of a token of the plurality of tokens generated by the backbone network.

Processing may continue at action 408, at which point cloud data may be received from a lidar sensor. In various examples, each point in the point cloud may be associated with a 3D coordinate identifying a position of the point in 3D space. The point cloud data may represent a depth map of the physical environment that is within the field of view of the lidar sensor.

Processing may continue at action 410, at which a second plurality of tokens comprising feature vectors representing the point cloud data may be generated. In various examples, a featurizer effective to generate token representations of the input point cloud data may be used to generate the second plurality of tokens. Processing may continue at action 412, at which position embeddings for the second plurality of tokens may be generated. In various examples, the position embeddings may correspond to 3D positions of the various tokens that represent the point cloud data. For example, a first token may represent one or more points of the point cloud. A position embedding for the first token may encode the spatial position of the first token within the point cloud.

Processing may continue at action 414, at which a transformer encoder may be used to generate a first modified plurality of tokens by modifying the feature vectors of the first plurality of tokens to include information about the second plurality of tokens using self-attention. For example, the first plurality of tokens representing the first frame of image data may be modified to include context information from the point cloud data using the self-attention mechanism of the transformer encoder.

Processing may continue at action 416, at which the transformer encoder may be used to generate a second modified plurality of tokens by modifying the feature vectors of the second plurality of tokens to include information about the first plurality of tokens using self-attention. For example, the second plurality of tokens representing the point cloud lidar sensor data may be modified to include context information from the 2D frame of image data using the self-attention mechanism of the transformer encoder.

Processing may continue at action 418, at which a computer vision (CV) operation may be performed using the first modified plurality of tokens and the second modified plurality of tokens. The particular computer vision operation and/or other predictive task may be dependent on the tasks for which the particular transformer decoder and the prediction heads have been trained. Examples of computer vision tasks and/or predictive tasks that may be used in accordance with cross-modal sensor data fusion using a transformer may include semantic segmentation, 2D object detection, 3D object detection, image transforms (e.g., BEV transforms), 3D mapping, motion detection, obstacle detection, object tracking, etc.

Figure 5:
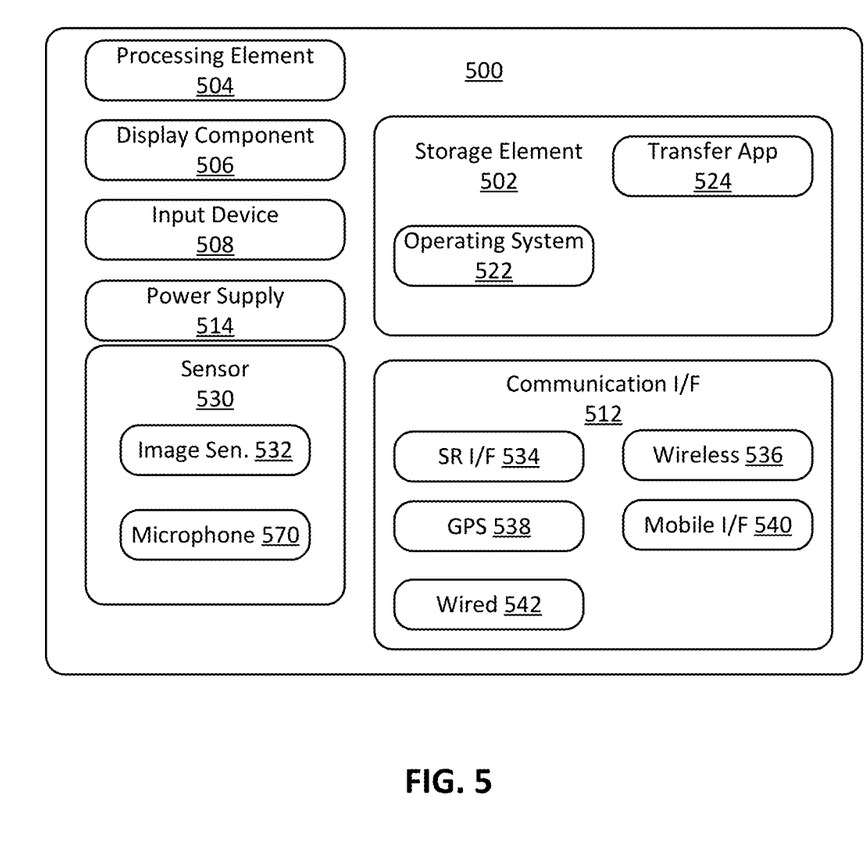
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the backbone networks and/or the transformer models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
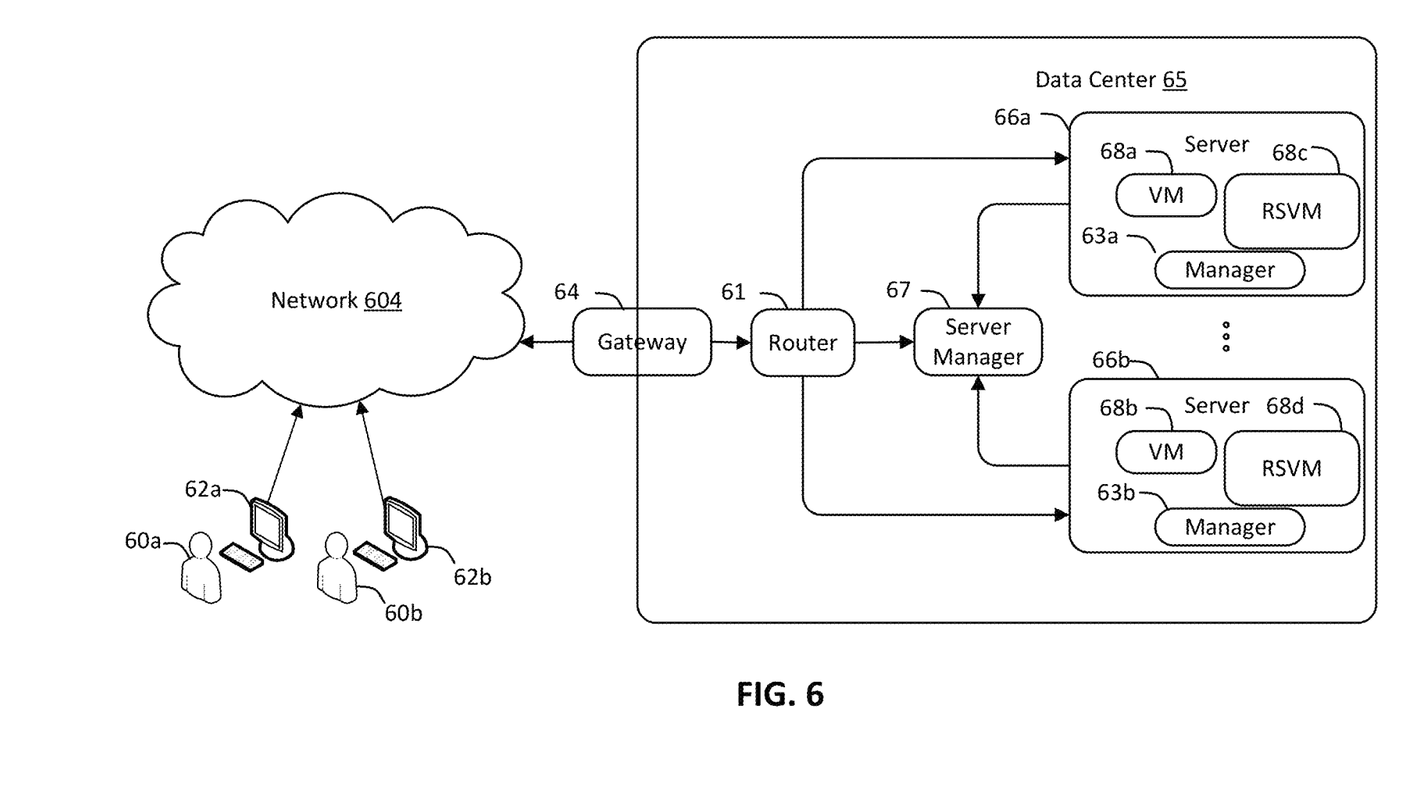
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving first sensor data from a first sensor;
   receiving second sensor data from a second sensor;
   generating a first feature representation of the first sensor data using a first machine learning model;
   generating a first position embedding for a first portion of the first feature representation, wherein the first position embedding relates the first portion of the first feature representation to a first spatial position of the first sensor data;
   generating a second feature representation of the second sensor data using a second machine learning model;
   generating a modified first feature representation of the first sensor data based at least in part on a self-attention mechanism of a transformer encoder, wherein the modified first feature representation represents a combination of the first feature representation with context from the second feature representation; and
   performing a task using the modified first feature representation.

2. The method of claim 1, wherein the first sensor comprises a first image sensor and the second sensor comprises a second image sensor, wherein the first image sensor and the second image sensor have different, overlapping fields of view with respect to one another.

3. The method of claim 1, wherein:
   the first sensor has a first modality;
   the second sensor has a second modality different from the first modality; and
   the modified first feature representation represents a combined feature representation of the first sensor data and the second sensor data.

4. The method of claim 1, wherein the first sensor comprises a first image sensor and the second sensor comprises a second image sensor, wherein the first image sensor and the second image sensor have different, overlapping fields of view with respect to one another, the method further comprising:
   detecting an object represented in the first sensor data based at least in part on a representation of the object in the second sensor data using the modified first feature representation.

5. The method of claim 1, wherein the modified first feature representation represents, at least in part, a difference in a first field-of-view of the first sensor and a second field-of-view of the second sensor.

6. The method of claim 1, wherein the task is a computer vision task related to autonomous navigation.

7. The method of claim 1, further comprising:
   generating the modified first feature representation of the first sensor data based at least in part on a plurality of sensors of different modalities, wherein the plurality of sensors comprises the first sensor, the second sensor, and at least one third sensor, and wherein the modified first feature representation represents attention calculated based at least in part on the first feature representation and the second feature representation.

8. The method of claim 1, further comprising determining a semantic segmentation map corresponding to the first sensor data and the second sensor data.

9. A system comprising:
   at least one processor;
   a first sensor;
   a second sensor; and
   non-transitory computer-readable memory storing instructions that, when executed by the at least one processor, are effective to:
      receive first sensor data from the first sensor;
      receive second sensor data from the second sensor;
      generate a first feature representation of the first sensor data using a first machine learning model;
      generate a first position embedding for a first portion of the first feature representation, wherein the first position embedding relates the first portion of the first feature representation to a first spatial position of the first sensor data;
      generate a second feature representation of the second sensor data using a second machine learning model;
      generate a modified first feature representation of the first sensor data using a self-attention mechanism of a transformer encoder, wherein the modified first feature representation represents a combination of the first feature representation with context from the second feature representation; and
      perform a task using the modified first feature representation.

10. The system of claim 9, wherein the first sensor comprises a first image sensor and the second sensor comprises a second image sensor, wherein the first image sensor and the second image sensor have different, overlapping fields of view with respect to one another.

11. The system of claim 9, wherein the first sensor comprises a first image sensor and the second sensor comprises a second image sensor, wherein the first image sensor and the second image sensor have different, overlapping fields of view with respect to one another, the non-transitory computer-readable memory storing further instructions that, when executed by the at least one processor, are further effective to:
   detect an object represented in the first sensor data based at least in part on a representation of the object in the second sensor data using the modified first feature representation.

12. The system of claim 9, wherein:
   the first sensor has a first modality;
   the second sensor has a second modality different from the first modality; and
   the modified first feature representation represents a combined feature representation of the first sensor data and the second sensor data.

13. The system of claim 9, wherein the first sensor comprises a first image sensor and the second sensor comprises a second image sensor, wherein the first image sensor and the second image sensor have different, overlapping fields of view with respect to one another, wherein the non-transitory computer-readable memory stores further instructions that, when executed by the at least one processor, is further effective to:
   detect an object represented in the first sensor data based at least in part on a representation of the object in the second sensor data using the modified first feature representation.

14. The system of claim 9, the non-transitory computer-readable memory storing further instructions that, when executed by the at least one processor, are further effective to send the modified first feature representation to a transformer decoder, wherein the transformer decoder is configured to perform a computer vision task.

15. The system of claim 9, the non-transitory computer-readable memory storing further instructions that, when executed by the at least one processor, are further effective to:
   generate the modified first feature representation of the first sensor data based at least in part on a plurality of sensors of different modalities, wherein the plurality of sensors comprises the first sensor, the second sensor, and at least one third sensor, and wherein the modified first feature representation represents attention calculated based at least in part on the first feature representation and the second feature representation.

16. A method comprising:
   receiving a first sensor data from a first image sensor, the first sensor data comprising a first frame of image data;
   receiving second sensor data from a light detection and ranging (LIDAR) sensor, the second sensor data comprising three-dimensional data;
   generating a first feature representation of the first frame of image data using a first machine learning model;
   generating a first position embedding for a first portion of the first feature representation, wherein the first position embedding relates the first portion of the first feature representation to a first spatial position of the first sensor data;
   generating a second feature representation of the three-dimensional data using a second machine learning model;
   generating a modified first feature representation of the first sensor data based at least in part on a self-attention mechanism of a transformer encoder, wherein the modified first feature representation represents a combination of the first feature representation with context from the second feature representation; and
   performing a task using the modified first feature representation.

17. The method of claim 16, further comprising:
   detecting an object represented in the first sensor data based at least in part on a representation of the object in the second sensor data using the modified first feature representation.

18. The method of claim 1, wherein the first sensor data comprises three-dimensional (3D) point cloud data and wherein the first position embedding represents one or more points in the 3D point cloud data.

19. The system of claim 9, wherein the first sensor data comprises three-dimensional (3D) point cloud data and wherein the first position embedding represents one or more points in the 3D point cloud data.

20. The method of claim 16, wherein the first sensor data comprises three-dimensional (3D) point cloud data and wherein the first position embedding represents one or more points in the 3D point cloud data.

* * * * *